Figure 1:
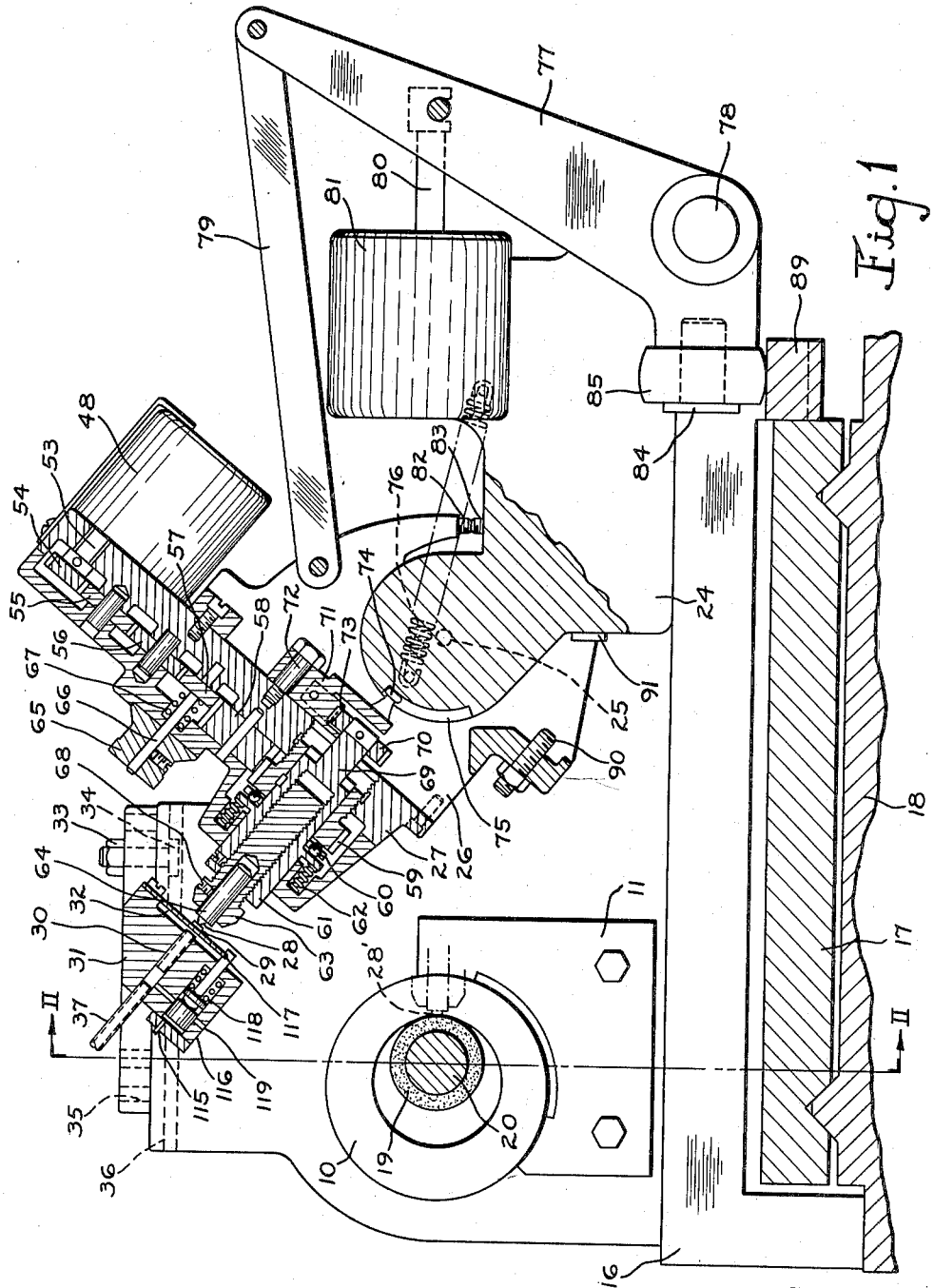

Feb. 5, 1957 A. F. TOWNSEND 2,780,036
GRINDING MACHINE
Filed Jan. 4, 1954 3 Sheets-Sheet 3

INVENTOR.
Almon F. Townsend
BY Norman S. Blodgett
Attorney

United States Patent Office 2,780,036
Patented Feb. 5, 1957

2,780,036
GRINDING MACHINE

Almon F. Townsend, Worcester, Mass., assignor, by mesne assignments, to Heald Machine Company, a corporation of Delaware Application January 4, 1954, Serial No. 401,848

27 Claims. (Cl. 51—103)

This invention relates to a machine tool and more particularly to apparatus for assuring extreme accuracy in the generation of surfaces.

In machine tools for generating in each of a succession of workpieces an internal surface of revolution, the diameter of such a surface is derived from the position of a tool point with respect to the axis of the work. In the case of one such machine, a wheel is trued by pressing it against a diamond truing element while the wheel is revolving and while the wheel and diamond are moving relative to one another axially of the wheel. Then, the wheel is moved into a bore whose surface is to be finished and the wheel is moved radially a fixed distance into the work. This would result in extremely close duplication of size from piece to piece, except for wear of the diamond truing element and a gradual shift that occurs in the relative position of other elements of the machine, due principally to thermal changes. It has, therefore, been necessary from time to time to make manual adjustments to keep the work within desired tolerances. Such adjustments may effect the positioning of the diamond truing element or the amount of radial wheel feed during actual grinding. In any case, difficulties are met in the initial positioning of the wheel by means of a manually operated tool-setting gauge or trial and error methods. A high degree of skill is required and the machine cannot produce while the tool is being set. The apparatus of the invention obviates these difficulties experienced with prior art devices in a novel and practical manner.

It is therefore an outstanding object of the present invention to provide apparatus for bringing about automatic adjustment in the relative position of two machine tool elements which determine the size of a generated surface.

Another object of this invention is to provide a tool positioning means for automatically bringing a tool into position after it has been placed in an approximate position.

It is a further object of the instant invention to provide a means for re-positioning a tool of a surface generating machine an amount necessary to correct for wear and for temperature changes in the machine and in the tool, this being accomplished during a part of the machine cycle in which the tool is not in use.

It is another object of the invention to provide means for automatically indexing or turning a tool to replace a worn cutting point with a new point and to bring the new point into correct position with respect to the axis of the work.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

Figure 2:
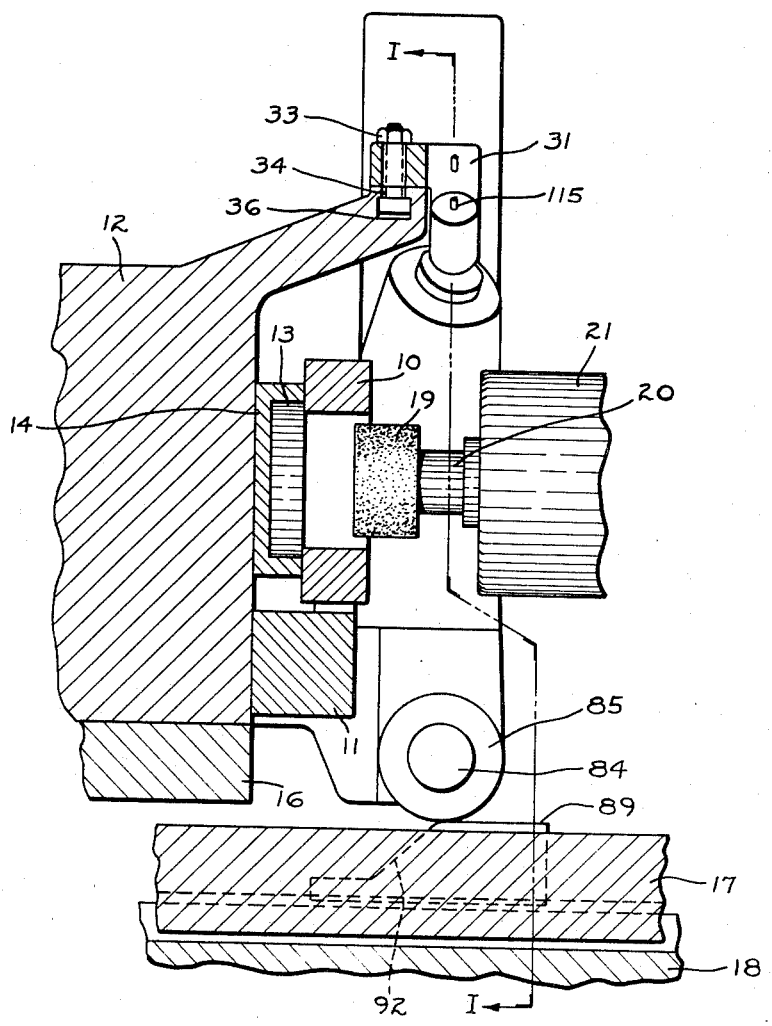
Figure 3:
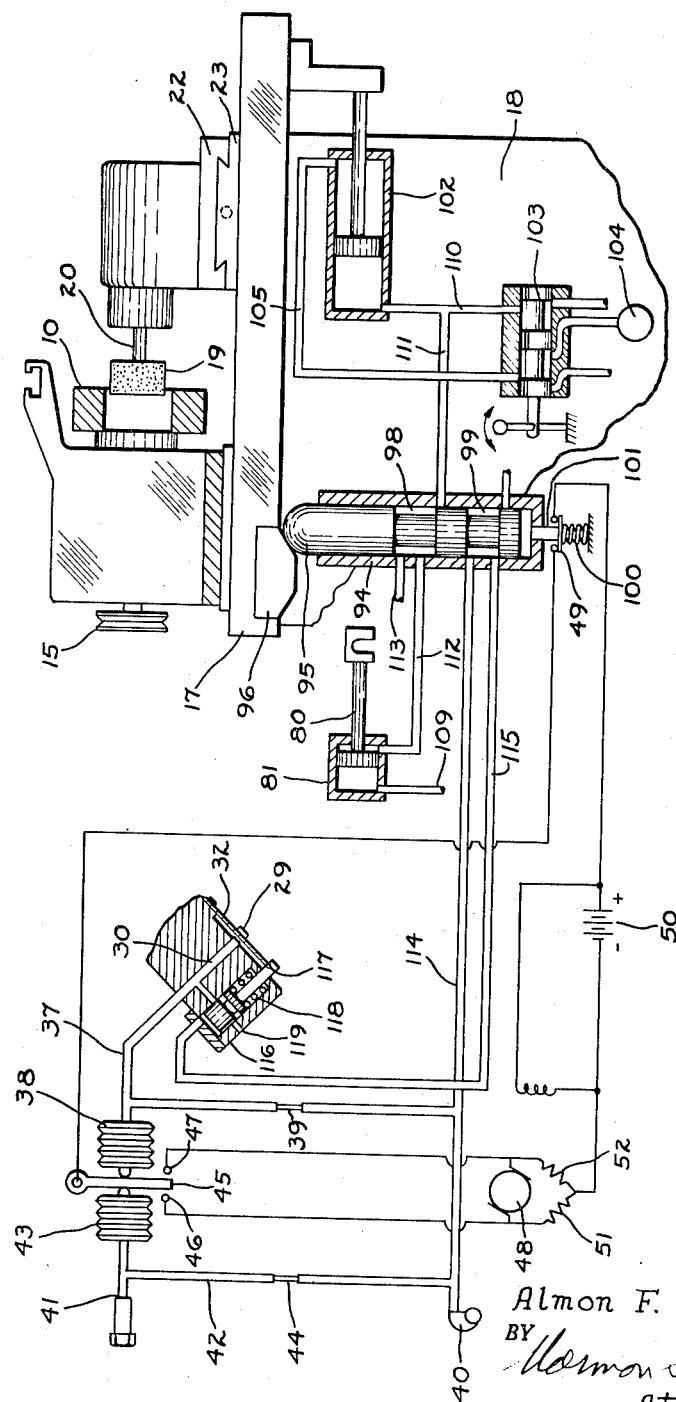

In said annexed drawings:

Figure 1 is a sectional view of the invention taken on the line I—I of Figure 2, Figure 2 is a sectional view of the invention taken on line II—II of Figure 1, and Figure 3 is a schematic view of certain elements of the invention, the parts being out of proportion for clarity of presentation.

Like reference characters denote similar parts in the several figures of the drawings.

Referring first to Figures 1 and 2, wherein is best shown the general features of the invention, an annular workpiece 10 is shown as held in a support 11 carried by a housing 12 which is preferably made of a material having a low coefficient of thermal expansion, such a material being iron or steel of high nickel content. The workpiece 10 is held in the support 11 and rotated by a means such as is described in Blood Patent No. 2,646,652 issued July 28, 1953, including a platen 13 which is attached to a spindle 14 journaled in suitable bearings, not shown, in the housing 12 and rotated by a sheave 15 (Figure 3).

The housing is mounted on a bridge 16 which straddles a table 17 which is arranged to reciprocate along a base 18 and to carry an abrasive wheel 19. The wheel is, in turn, mounted on a rotating spindle 20 in a motorized wheelhead 21 and the wheel is capable of being fed transversely to the axis of the work in the conventional manner, such as by a cross slide 22 (Figure 3) on a lower slide 23.

Attached to the bridge 16 is a bracket 24 to which is connected, by a pivot pin 25, a housing 26 which carries a dressing tool such as a truing unit 27 including a diamond 28. In the upper position of the unit 27, as shown in Figure 1, the diamond 28 engages an anvil 29 of hard material, thus fixing its position with respect to a gaging element such as an air nozzle in bracket 31. The anvil 29 is carried on a flexible reed 32 which is also attached to the bracket 31.

The bracket 31 is made of a material having a coefficient of thermal expansion which is different from that of the housing 12 and it is fastened to the housing 12 by means of a nut 33 and a T-bolt 34 passing through one of a series of holes 35 in the bracket 31 to engage a T-slot 36. A proper choice of the point at which the bracket 31 is fastened to the housing 12 will substantially reduce the effects of thermal changes in different parts of the machine on the position of the diamond 28 relative to the work support 11 when the diamond 28 has been adjusted, as will be described hereinafter, and is swung down to engage the wheel 19 at the position shown in phantom in Figure 1 at 28'.

The distance between the reed 32 and the nozzle 30 determine the pressure in a line 37 and a bellows 38 which are supplied with pressure air through a restriction 39 which is connected to a compressed air source 40. An adjustable orifice 41 governs the air pressure in a line 42 and a bellows 43 connected therewith, the line 42 and the bellows 43 being supplied with pressure air from the same source 40 through a restriction 44.

The bellows 38 and 43 are adapted to move a switch arm 45 between two contacts 46 and 47. The contacts are connected one to each side of a direct current motor armature 48. The arm 45 is connected through a normally closed switch 49 to the positive side of a source of direct current such as a battery 50. The field of the motor is connected across the battery 50 and the negative side of the battery is connected through resistances 51 and 52 to the contacts 46 and 47 respectively. The motor armature 48 will turn in one direction or the other, depending on which contact 46 or 47 is engaged by the arm 45.

Referring to Figure 1, wherein is best shown a mechanism for adjusting the position of the diamond 28 and to present a new face to the wheel 19 after every cycle of operation, the motor 48 drives a shaft 53 on which is keyed a gear 54. The gear 54 engages and drives a train of gears 55, 56, 57, 58 and 59. Gear 59 is threaded into the housing 27 and, when it turns, it either presses outwardly through a set of balls 60 against a sleeve 61 or it permits the sleeve 61 to be moved inwardly by springs 62. Carried in the sleeve 61 is an adjusting screw 63 which holds a diamond nib 64 in which is fastened the diamond 28.

A knob 65 fastened to a shaft 66 which is integral with the gear 57. Manual adjustment of the diamond may be made by turning the knob 65 after pulling it to move the gear 57 against the pressure of a spring 67 and to disengage the gear 57 from the gear 56. Because of the breadth of the face of the gear 58, however, the pulling outwardly of the knob 65 does not disengage the gear 57 from the gear 58. A new diamond nib 64 may be fastened in the adjusting screw 63 by means of set screw 68 and the initial setting may be such that the diamond 28 clears the anvil 29 when the housing 26 has been swung into its upper position, as shown in Figure 1. The motor 48 will then turn until the diamond 28 is in the proper position, because of the sequence of events which will be described hereinafter. Readjustment is made automatically to compensate for wear and thermal changes whenever the housing 26 is in its upper position.

The end of the sleeve 61 which is away from the diamond is closed and is provided with a coaxial shaft 69 to the outer end of which is fastened a ratchet 70. A lever 71 is pivotally fastened to the housing 27 by means of a bolt 72 and to the lever is fastened a pawl spring 73 which engages the ratchet 70. From another portion of the lever 71 extends a cam follower 74 which rides in a cam slot 75 formed in the bracket 24. The slot has a substantial component in the direction of the axis of the workpiece, so that the movement of the housing 26 about the pivot pin 25 results in the pivotal movement of the lever 71 about the bolt 72, whereupon the pawl spring 73 engages the teeth in the ratchet 70 and indexes the diamond. It is to be noted that the truing unit 27 forms an angle of less than 90 degrees with the axis of the wheel 19, so that the diamond will wear to pyramidal shape. The ratchet 70 is preferably formed with an odd number of teeth and the indexing is done two teeth at a time. An over-center spring 76 is connected between the housing 26 and the bracket 24 to hold the former in its upper position.

A substantially vertical elongated lever 77 is pivotally connected to the bracket 24 by means of a pin 78. At its upper end, the lever is connected to the housing 26 by means of a link 79. At its intermediate portion, the lever 77 is connected by a slot-and-pin connection to one end of a rod 80, the other end of which is connected to the piston of a hydraulic motor 81. At the lower end of the lever 77 is situated a stud 84 on which a roller 85 is freely and rotatably mounted. When the hydraulic motor 81 urges the lever 77 counterclockwise, the roller 85 moves downwardly until it rests on a cam 89 which is attached to the table 17. When the table 17 has moved far enough to the right for the wheelhead 21 to clear the truing unit 27, the roller 85 rolls down an incline 92 on the cam 89, thus swinging the lever 77 and the housing 26 counterclockwise until a screw 90 strikes a stop 91 in the bracket 24. As the table 17 moves to the left, the roller 85 engages on incline 92, raising the stud 84 and the unit 27 so that the wheelhead 21 cannot strike it accidentally.

Referring to Figure 3, a valve 94 is arranged under the table 17 so that its plunger 95 may be engaged by a cam 96 fastened to the table. The plunger 95 is formed with annular grooves 98 and 99 and is urged into an upward position by a spring 100 which also tends to keep the normally-closed switch 49 in its closed position. A finger 101 forming a part of the switch 49 engages the bottom of the plunger 95. A hydraulic motor 102 is connected to the table 17 for the reciprocation thereof. A reversing valve 103 is connected to the table by means, not shown whereby oil from a pressure source is directed to one of two lines 105 and 110, the reversing action taking place at the ends of table motion in the conventional manner. One end of the motor 81 is connected by a line 109 to exhaust. The opposite end of the motor 81 is connected by a line 112 to the valve 94 at a position lying within the groove 98 when the valve plunger is in its upper position; an outlet line 113 is connected to the valve in the same position. A pneumatic line 114 is connected at one end to the source of pressure air 40 and at the other end to the valve 94 in such a position that it lies within the groove 99 when the plunger is in its upper position. A line 115 is connected to the groove 99 in the same position in the valve and is connected at its other end to one side of a pneumatic motor 116 situated in the bracket 31. This motor has a piston rod having a notch 117 in which the free end of the reed 32 lies. The piston of the motor is normally biased to retracted position by a spring 118 whereby the reed is pressed against the nozzle 30. A passage 119 from the nozzle to the atmosphere is provided through an annular groove in the piston of the motor, the passage being complete only when the piston is retracted.

The operation of the apparatus will now be understood in view of the above description. With the workpiece 10 held against the platen 13 and supported by the support 11 and rotated by the spindle 14, the wheel 19 is reciprocated within the workpiece. This reciprocation takes place by means of the hydraulic motor 102, the reversing valve causing oil under pressure to enter first one end and then the other of the motor. The stroke is extended to move the wheel 19 for truing in the conventional manner. Feed into the work takes place by relative movement between the cross slide 22 and the lower slide 23 in the usual manner. When the truing unit 27 is in its upper position, the diamond engages the anvil mounted on the reed 32. If the distance between the reed and the nozzle 30 at that time differs from a preset value, the pressure in the bellows 43 and 38 do not balance and the arm 45 moves to touch one of the contactors 46 or 47. This completes a circuit from the positive side of the direct current source 50 through the switch 49, the switch arm 45, one of the contactors 46 or 47, the motor armature 48 and resistances 51 and 52 to the negative side of the direct current source, thus turning the motor armature in one direction or the other to correct the error. The motor armature 48 drives the gears 54, 55, 56, 57, 58 and 59 and moves the diamond axially through the medium of the threaded connection between the gear 59 and the housing 27. Manual adjustment may be accomplished by means of the knob 65, as has been described hereinbefore.

With the parts in the condition shown in the drawings and with the table moving to the right, the valve plunger 95 is about to be depressed by the table cam 96. The movement of the plunger downwardly opens the switch 49, thus stopping the motor armature 48. Further downward movement of the valve plunger disconnects the line 115 from the line 114 and from the source 40 of pressure air and it also connects the line 115 with atmosphere because of the fact that the groove 99 is moved into a position to bridge the line 115 and an exhaust line. The opening of the line 115 to atmosphere causes the spring 118 to move the piston of the motor 116 to retracted position, expelling the air in the cylinder and clamping the reed 32 over the mouth of the nozzle 30. Air from line 37 can now escape through the passage 119.

Further downward movement of the valve plunger 95 disconnects the line 112 from the exhaust line 113 and connects it to the oil line 111 which runs to the left end of the table motor 102 and is now under pressure, the reversing valve being in such condition as to connect it with the source 104. The piston of the motor 81 moves to the left, urging the housing 26 counterclockwise through the piston rod 80, the lever 77, and the link 79. The roll 85 moves downwardly until it rests on the cam 89 attached to the table 17. When the table 17 has moved far enough to the right for the wheelhead 21 to clear the truing unit 27, the roll 85 moves down the incline 92, thus permitting the truing unit to move downwardly to engage the wheel.

The diamond 28 is now in the truing position 28′ and, after the wheel 19 has passed over it, the reversing valve 103 will be reversed in the usual manner, by limit dogs or the like, causing the table 17 to move toward the left. Line 112 is now connected to exhaust through line 111. The incline 92 on the cam 89 raises the roll 85, swinging the housing 26 clockwise until motion is prevented by the engagement of stops 82 and 83 on the housing 26 and the bracket 24, respectively. The over-center spring 76 holds the housing 26 in its upper position. As the housing 26 swings down and up, the follower 74 on the lever 71 traverses the cam slot 75 in the bracket 24. The lever 71 is thereby swung back and forth, carrying the pawl spring 73 which turns and indexes the ratchet 70 fastened to the sleeve 61. The diamond 28 is thus indexed automatically to present a different surface to the wheel instead of wearing to conform with the wheel, which would cause it to get dull and exert excessive force on the wheel. This is, of course, especially important in internal grinding where the wheel is supported on a relatively flexible spindle and chatter is apt to result if the wheel is trued with a dull diamond. By indexing the diamond and thereafter automatically re-positioning it before truing, the serious errors in position and work size are avoided that would result if the diamond were simply indexed. As the table 17 moves to the left to resume grinding, the cam 96 runs off the valve plunger 95 which connects the line 115 to pressure line 114, causing the motor 116 to move outwardly and release the reed 32, allowing the anvil 29 to rest on the diamond 28. The switch 49 then closes and the motor 48 begins to re-position the diamond if it is out of position.

Other modes of applying the principles of the invention may be employed, change being made as regards the details described, provided the features stated in the following claims, or the equivalent of such, be employed.

I therefore particularly point out and distinctly claim as my invention:

1. A machine tool comprising means for holding and rotating a work piece, a table on which the said means is supported, a tool supported by the table movable between an operating position and an inoperative position, a gaging member supported by the table for engaging the cutting surface of the tool in its inoperative position, said gaging member including an anvil, means actuated by movement of said anvil with respect to a fixed reference position for moving the said cutting surface of the tool to a predetermined position relative to the work holding means, and means operating in timed relation with the movement of the tool between the said operative and inoperative position to render the tool-adjusting means inoperative.

2. A machine tool comprising a base member, a table member mounted on the base member, means for holding and rotating a work piece supported by one of the said members, a rotating grinding wheel supported by the other of the said members movable between a first position away from the work piece and a second position in engagement therewith, a dressing tool supported by the same one of the said members as the said work holding means, the tool engaging the cutting surface of the wheel in its position away from the work piece, an anvil engaged by the dressing tool, a first means actuated by the movement of said anvil away from an initial position for moving the said dressing tool to a predetermined position relative to the work holding means, and a second means actuated by the movement of the wheel between the said first and second positions to render the first means inoperative.

3. A machine tool comprising a base member, a table member mounted on the base member, means for holding and rotating a work piece supported by one of the said members, a rotating grinding wheel supported by the other of the said members movable between a first position away from the work piece and a second position in engagement therewith, a dressing tool supported by the same one of the said members as the said work holding means, the tool engaging the cutting surface of the wheel in its position away from the work piece, an anvil engaged by the dressing tool, means including a pneumatic system actuated by the movement of said anvil away from an initial position for moving the said dressing tool to a predetermined position relative to the work holding means, and means actuated by the movement of the wheel between said first and second positions to render the said pneumatic system ineffective while the tool is dressing the wheel.

4. A machine tool comprising a base member, a table member mounted on the base member, means for holding and rotating a work piece supported by one of the said members, a rotating grinding wheel supported by the other of the said members movable between a first position away from the work piece and a second position in engagement therewith, a dressing tool supported by the same one of the said members as the said work holding means, the tool engaging the cutting surface of the wheel in its position away from the work piece, an anvil engaged by the dressing tool at a position removed from the position of engagement with the wheel, means including a fluid system actuated by the movement of said anvil away from an initial position for controlling the movement of the said dressing tool to a predetermined position relative to the work holding means, means actuated by the movement of the wheel between said first and second positions to render the said fluid system inoperative, and means responsive to movement of the dressing tool between positions to change the portion of the tool which contacts the wheel.

5. A machine tool comprising a base member, a table member mounted on the base member, means for holding and rotating a work piece supported by one of the said members, a rotating grinding wheel supported by the other of the said members movable between a first position away from the work piece and a second position in engagement therewith, a dressing tool including a diamond supported by the same one of the said members as the said work holding means, the tool engaging the cutting surface of the wheel in its position away from the work piece, an anvil engaged by the dressing tool, a fluid system actuated by the movement of said anvil away from an initial position for moving the said dressing tool to a predetermined position relative to the work holding means, means actuated by the movement of the wheel between said first and second positions to render the said fluid system inoperative, and means changing the aspect of the diamond to the wheel at frequent intervals.

6. A machine tool comprising a base member, a table member mounted on the base member, means for holding and rotating a work piece supported by one of the said members, a rotating grinding wheel supported by the other of the said members movable between a first position away from the work piece and a second position in engagement therewith, a dressing tool supported by the same one of the said members as the said work holding means, the tool engaging the cutting surface of the wheel in its position away from the work piece, an anvil engaged by the dressing tool, means including a fluid system actuated by the movement of said anvil away from an initial position for moving the said dressing tool to a predetermined position relative to the work holding means, means actuated by the movement of the wheel between said first and second positions to render the said fluid system inoperative, and means indexing the dressing tool about an axis which forms an angle of less than a right angle with the surface of the wheel when the dressing tool is in dressing position.

7. A machine tool comprising a base member, a table member mounted on the base member, means for holding and rotating a work piece supported by one of the said members, a rotating grinding wheel supported by the other of the said members movable between a first position away from the work piece and a second position in engagement therewith, a dressing tool supported by the same one of the said members as the said work holding means, the tool engaging the cutting surface of the wheel in its position away from the work piece, said dressing tool at one time in the cycle engaging the wheel for correction of errors therein, a gaging member including an anvil adapted to be engaged by the dressing tool at another time in the cycle, and means actuated by movement of said anvil away from an initial position for moving the said dressing tool to a predetermined position relative to the work piece holding means.

8. A machine tool comprising a base member, a table member mounted on the base member, means for holding and rotating a work piece supported by one of the said members, a rotating grinding wheel supported by the other of the said members movable between a first position away from the work piece and a second position in engagement therewith, a dressing tool supported by the same one of the said members as the said means for holding a work piece, the tool engaging the cutting surface of the wheel in its position away from the work piece, said dressing tool being rotatable about an axis from a first position wherein it may engage the cutting surface of the wheel to a second position somewhat removed from the first position, a gaging member including an anvil adapted to be engaged by the dressing tool in its second position, means for separating the anvil from the dressing tool until it reaches and before it leaves its second position, and a fluid system actuated by movement of said anvil away from an initial position for moving said dressing tool to a predetermined position relative to the axis about which the dressing tool is rotatable.

9. A machine tool comprising a base member, a table member mounted on the base member, means for holding and rotating a work piece supported by one of the said members, a rotating grinding wheel supported by the other of the said members movable between a first position away from the work piece and a second position in engagement therewith, a dressing tool supported by the same one of the said members as the said work holding means, the tool engaging the cutting surface of the wheel in its position away from the work piece, said dressing tool being movable from a first position wherein it may engage the cutting surface of the wheel to a second position somewhat removed from the first position, a gaging member including an anvil adapted to be engaged by the dressing tool in its second position, power means actuated by movement of said anvil away from an initial position for moving said dressing tool to a predetermined position relative to the work piece holding means, the dressing tool being also rotatable about an axis at an angle of less than 90° to the said cutting surface.

10. A machine tool comprising a base member, a table member mounted on the base member, means for holding and rotating a work piece supported by one of the said members, a rotating grinding wheel supported by the other of the said members movable between a first position away from the work piece and a second position in engagement therewith, a dressing tool supported by the same one of the said members as the said means for holding a work piece, the tool engaging the cutting surface of the wheel in its position away from the work piece, said truing tool being movable from a first position wherein it may engage the cutting surface of the wheel to a second position somewhat removed from the first position, a gaging member including an anvil adapted to be engaged by the truing tool in its second position, power means responsive to movement of said anvil away from an initial position for adjusting said truing tool to a predetermined position relative to the means for holding the work piece, and means rotating the truing tool intermittently about an axis which lies at an angle of less than 90° to said cutting surface when the dressing tool is in its first position.

11. A machine tool comprising a base member, a table member mounted on the base member, means for holding and rotating a work piece supported by one of the said members, a rotating grinding wheel supported by the other of the said members movable between a first position away from the work piece and a second position in engagement therewith, a dressing tool including a diamond supported by the same one of the said members as the said means for holding a work piece, the diamond engaging the cutting surface of the wheel in its position away from the work piece, said dressing tool being rotatable about an axis generally parallel to the axis of the wheel from a first position wherein it may engage the cutting surface of the wheel to a second position somewhat removed from the first position, a gaging member adapted to be engaged by the dressing tool in its second position, means including a fluid system actuated by movement of the gaging member for moving said dressing tool to a predetermined position relative to the axis of rotation of the wheel, and index means responsive to the movement of the dressing tool between the said first and second positions for changing the aspect of the diamond to the wheel.

12. A machine tool comprising a base member, a table member mounted on the base member, means for holding and rotating a work piece supported by one of the said members, a rotating grinding wheel supported by the other of the said members movable between a first position away from the work piece and a second position in engagement therewith, a dressing tool supported by the same one of the said members as the said means for holding a work piece, the tool engaging the cutting surface of the wheel in its position away from the work piece, said dressing tool being rotatable about an axis substantially in the plane of the axes of the wheel and the work piece from a first position wherein it may engage the cutting surface of the wheel to a second position somewhat removed from the first position, a gaging member including an anvil mounted on a flexible reed and adapted to be positioned by the dressing tool in its second position, power means including a leakage orifice the flow through which is determined by the distance between the orifice and said reed and adapted to move said dressing tool relative to the axis of rotation of the wheel.

13. In an internal grinding machine having a wheel in a wheel support, a support for a work piece and a member movable to bring the wheel and work piece into and out of engagement, the combination of a diamond mounted in a holder for rotation, gaging means in fixed relation to the work support, and means timed with the motion of said member to turn the diamond, to move it relatively into operative relation with the gaging means, to adjust the diamond in response to the gaging means, and to move the diamond and wheel into operative position for truing the wheel.

14. In an internal grinding machine having a wheel in a wheel support, a support for a work piece and a member movable to bring the wheel and work piece into and out of engagement, the combination of a diamond mounted in a holder for rotation, gaging means in fixed relation to the work support, and means timed with the motion of said member to move the diamond relatively into operative relation with the gaging means, to adjust the diamond in response to the gaging means, and to move the diamond and wheel into operative position for truing the wheel.

15. In an internal grinding machine having a wheel in a wheel support, a support for a work piece and a member movable to bring the wheel and work piece into and out of engagement, the combination of a diamond mounted in a holder for rotation, gaging means in fixed relation to the work support, and means which is timed with the motion of said member to turn the diamond and to move the diamond and wheel into operative position for truing the wheel.

16. In a grinding machine, a wheel in a wheel support, a support for a work piece, a diamond mounted for rotation about its axis in a diamond holder, gaging means mounted in fixed relation to the work support, means to rotate the diamond by increments, means operative after rotation of the diamond to move the diamond and gaging means relatively into operative relation, means responsive to gaging means to adjust the diamond, means to separate the wheel and work for a truing operation, means to move the diamond and the wheel into operative relation, means to return the wheel and work relatively into operative position, thereby finishing the work to a predetermined dimension.

17. In a wheel truing unit for a grinding machine, a diamond mounted for rotation about an axis passing through the diamond, power means for repeatedly procuring increments of rotation of said diamond about said axis, automatic gaging means timed with said power means for determining the position of the diamond after each such increment of rotation, and means responsive to said gaging means for repositioning the said diamond.

18. In an internal grinding machine, a work support, a rotatably mounted diamond, power means to procure step-by-step rotation of the diamond, each step making a different portion of the surface of the diamond effective for truing action, automatic means for determining the position of the effective surface portion relative to said work support, and means responsive to said determining means to move said surface portion into a predetermined position relative to said work support.

19. In a grinding machine, a work support, a housing for the work support, a wheel, a truing tool, a holder adapted to move the truing tool into a truing position and into a gaging position, gage means adapted to sense a deviation of the truing tool from a predetermined position relative to the work support when the truing tool is in gaging position, means for fixing the position of the gage means relative to the work support, said means including a member having a thermal coefficient of expansion differing substantially from that of the housing, and power means responsive to the gage means to adjust the holder, thereby correcting said deviation.

20. In a machine tool for finishing an inner surface of revolution in a succession of work pieces, a work support, a tool in a tool holder, gage means for determining the position of the tool relative to the work support, power means responsive to the gage means to adjust the position of the tool when situated in a first position and thereby to adjust the diameter of said surface, power means operable before the adjustment of the tool to move the tool from the said first position into a second position in operative relationship with the gage means, and power means operable after the adjustment of the tool to move it out of operative relation to the gage and into its first position.

21. In a machine tool, a supporting member, a work support on said member, a tool support movably connected to said member whereby a tool in said tool support may be moved between a first and a second position, a gaging member for engaging the cutting surface of the tool in its first position, said gaging member including a resiliently-mounted anvil having comparatively low inertia, means actuated by movement of said anvil with respect to a fixed reference position for moving said cutting surface to a predetermined position relative to the work holder, and means operating in timed relation with the movement of said tool between the first and second positions to render the tool adjusting means inoperative.

22. In a grinding machine, a work support, a wheel, a wheel support, a slide for relatively moving said supports to procure a grinding operation between the wheel and a work piece carried by the work support, a movable member, a truing tool carried by said member, means acting in timed relation with the movement of the slide to move said member and tool between an operative and an inoperative position, a reference surface rigidly attached to said work support, and power-actuated means including a reversible motor responsive to the relation between the surface and the tool in its inoperative position to adjust the tool toward and away from the surface.

23. A machine as recited in claim 22 wherein is provided a resiliently mounted gaging member having a hard tool-engaging portion interposed between said surface and said tool.

24. A grinding machine comprising a base member, a slide member, a work support on one of said members, a wheel support on the other member, said slide member being movable to bring the wheel and work relatively into and out of engagement, a truing tool for engaging the wheel when out of work-engaging position, an anvil having comparatively low inertia engaged by the truing tool, a first means actuated by movement of the said anvil away from an initial position for moving the said truing tool to a predetermined position relative to the work support, and a second means actuated by the movement of the slide means to render said first means inoperative.

25. A machine tool comprising a work support, a wheel, and a wheel support, a base carrying one support, a slide carrying the other support and adapted to move the wheel relatively between a first position away from a workpiece in the work support and a second position in engagement therewith, a dressing tool including a diamond for dressing the wheel in its position away from the workpiece, an anvil engaged by the dressing tool, means including a pneumatic system actuated by the movement of said anvil away from an initial position for adjusting the dressing tool toward or away from the work support to a predetermined position relative to the work support.

26. A machine tool as recited in claim 25 wherein is provided a means acting in timed relation to the said movement of the slide to move the dressing tool away from its dressing position and into gaging position, and to index said tool.

27. A machine tool as recited in claim 25 wherein is provided a rotatable dressing tool, a holder for the tool having a pivot, power operable means to swing the holder about its pivot out of dressing position, to index it to make a new cutting surface of the tool effective, and thereafter to adjust the position of the new cutting surface toward or from the pivot to a predetermined position relative to the gaging surface.

References Cited in the file of this patent

UNITED STATES PATENTS

| | | |
|---|---|---|
| 1,497,574 | McDonough | June 10, 1924 |
| 1,899,654 | Ward | Feb. 28, 1933 |
| 2,207,177 | Rentzell | July 9, 1940 |
| 2,646,652 | Blood | July 28, 1953 |
| 2,648,171 | Hill | Aug. 11, 1953 |
| 2,680,939 | Humes | June 15, 1954 |